(12) United States Patent
Lu et al.

(10) Patent No.: US 10,698,503 B2
(45) Date of Patent: Jun. 30, 2020

(54) DETACHABLE COMPUTER MOUSE

(71) Applicants: DEXIN ELECTRONIC LTD., Dongguan, Guangdong (CN); DEXIN CORPORATION, New Taipei (TW)

(72) Inventors: Ho-Lung Lu, New Taipei (TW); Yih-Wen Chen, Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 5 days.

(21) Appl. No.: 16/111,275

(22) Filed: Aug. 24, 2018

(65) Prior Publication Data

US 2019/0064940 A1   Feb. 28, 2019

(30) Foreign Application Priority Data

Aug. 25, 2017   (TW) .............................. 106212638 U (51) Int. Cl.
   *G06F 3/033* (2013.01)
   *G06F 3/0354* (2013.01)
(52) U.S. Cl.
   CPC .......... *G06F 3/03543* (2013.01); *G06F 3/033* (2013.01); *G06F 3/0354* (2013.01); *G06F 2203/033* (2013.01)

(58) Field of Classification Search
   CPC ........................... G06F 3/0354; G06F 3/03543
   See application file for complete search history.

(56) References Cited

U.S. PATENT DOCUMENTS

2017/0045959 A1* 2/2017 Chen ................... G06F 3/03543
2018/0356909 A1* 12/2018 Dayer ................. G06F 3/03541

* cited by examiner

*Primary Examiner* — Xuemei Zheng
(74) *Attorney, Agent, or Firm* — Li & Cai Intellectual Property (USA) Office (57) ABSTRACT

A detachable computer mouse includes a mouse body and a detachable input module. The mouse body is provided with a plurality of first magnetic members, a pogo-pin assembly, a first snap-fit member and a second snap-fit member. The detachable input module is provided with a plurality of second magnetic members, a metal pad assembly, a first hook and a second hook, and a plurality of function buttons. The first magnetic members are correspondingly and magnetically adhered with the second magnetic members, the pogo-pin assembly is correspondingly in direct contact with the metal pad assembly, and the first snap-fit member and the second snap-fit member are respectively elastically snap-fitted to the first hook and the second hook when the detachable input module is coupled to the mouse body.

8 Claims, 9 Drawing Sheets

DETACHABLE COMPUTER MOUSE

CROSS REFERENCE TO RELATED APPLICATION

This application claims foreign priority benefits under 35 U.S.C. § 119(a)-(d) to TW 106212638 filed Aug. 25, 2017, which are hereby incorporated by reference in its entirety.

BACKGROUND OF THE INVENTION

1. Field of the Invention

The present disclosure relates to a computer mouse, and in particular, to a detachable computer mouse.

2. Description of Related Art

In today's era of widespread computer use, more and more computer mice are constantly being designed and improved to facilitate the operation of computers. At present, some computer mice have extra function buttons on their side for users to quickly perform certain functions. The side function buttons (or simply called side buttons) are usually only placed on one side of the mouse, with the number thereof ranging from a minimum of one to sometimes up to twelve. In addition to making the routine browsing of the web more convenient, the function of the side buttons can effectively improve the efficiency of computer games that require many hot keys (especially in massively multiplayer online role-playing games—MMORPGs). However, in general, the number of side buttons is fixed. A mouse with fewer side buttons may be ill-equipped for a computer game with complex functions, while a mouse with more side buttons may also have redundant buttons that are unused. Therefore, various detachable input modules with different side buttons have become available on the market for different player groups, such as hardcore gamers. The detachable input modules are mechanically and electrically connected to the body of the mouse by the attraction of a magnet and the mating of a pogo-pin assembly with a metal pad assembly. However, due to the inherent elastic force of a pogo pin, when the pogo-pin assembly and the metal pad assembly are mated, it is impossible to achieve a firm coupling only by the magnetic attraction, and thus often causes trouble for hardcore game players.

The abovementioned drawbacks of the existing detachable computer mouse seem to suggest that there is still room for improvement in the art.

SUMMARY OF THE INVENTION

One objective of the present disclosure is to provide a detachable computer mouse that can overcome the aforementioned drawbacks.

In order to achieve the object above, one of the embodiments of the instant disclosure provides a detachable computer mouse, including a mouse body and a detachable input module. The mouse body is provided with a plurality of first magnetic members, a pogo-pin assembly, a first snap-fit member and a second snap-fit member, which are located at one side of the mouse body. The detachable input module is provided with a plurality of second magnetic members, a metal pad assembly, a first hook and a second hook, which are located at one side of the detachable input module, and a plurality of function buttons, which are located at another side of the detachable input module. The detachable input module is selectively coupled to the mouse body. The first magnetic members are correspondingly and magnetically adhered with the second magnetic members, the pogo-pin assembly is correspondingly in direct contact with the metal pad assembly, and the first snap-fit member and the second snap-fit member are respectively elastically snap-fitted to the first hook and the second hook when the detachable input module is coupled to the mouse body.

Therefore, the detachable computer mouse in accordance with the present disclosure is able to solve the problem of loose coupling between the pogo-pin assembly and the metal pad assembly when mated by magnetic force alone. This is achieved by providing the first snap-fit member and the second snap-fit member on one side of the mouse body, and additionally by disposing the first hook and the second hook on the corresponding side of the detachable input module. The first snap-fit member and the second snap-fit member can be elastically snap-fitted to the first hook and the second hook, respectively, to form a firm coupling.

For further understanding of the present disclosure, the following embodiments are provided to facilitate the disclosure of the present disclosure.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Referring to FIGS. 1 through 9, the detachable computer mouse in accordance with the present disclosure mainly has a mouse body 1 and a detachable input module 2.

Figure 1:
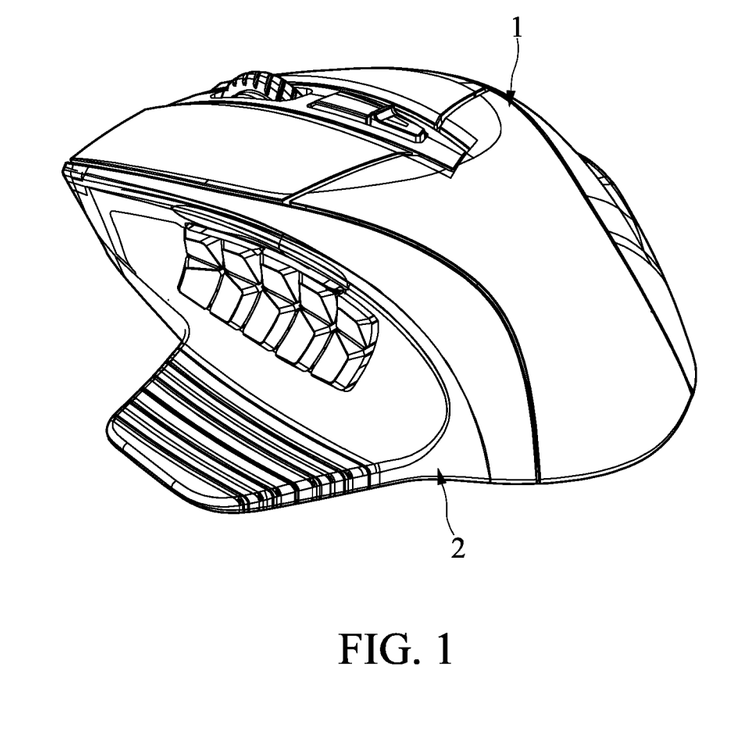
FIG. 1 shows a perspective view of a detachable computer mouse of the present disclosure.
Figure 2:
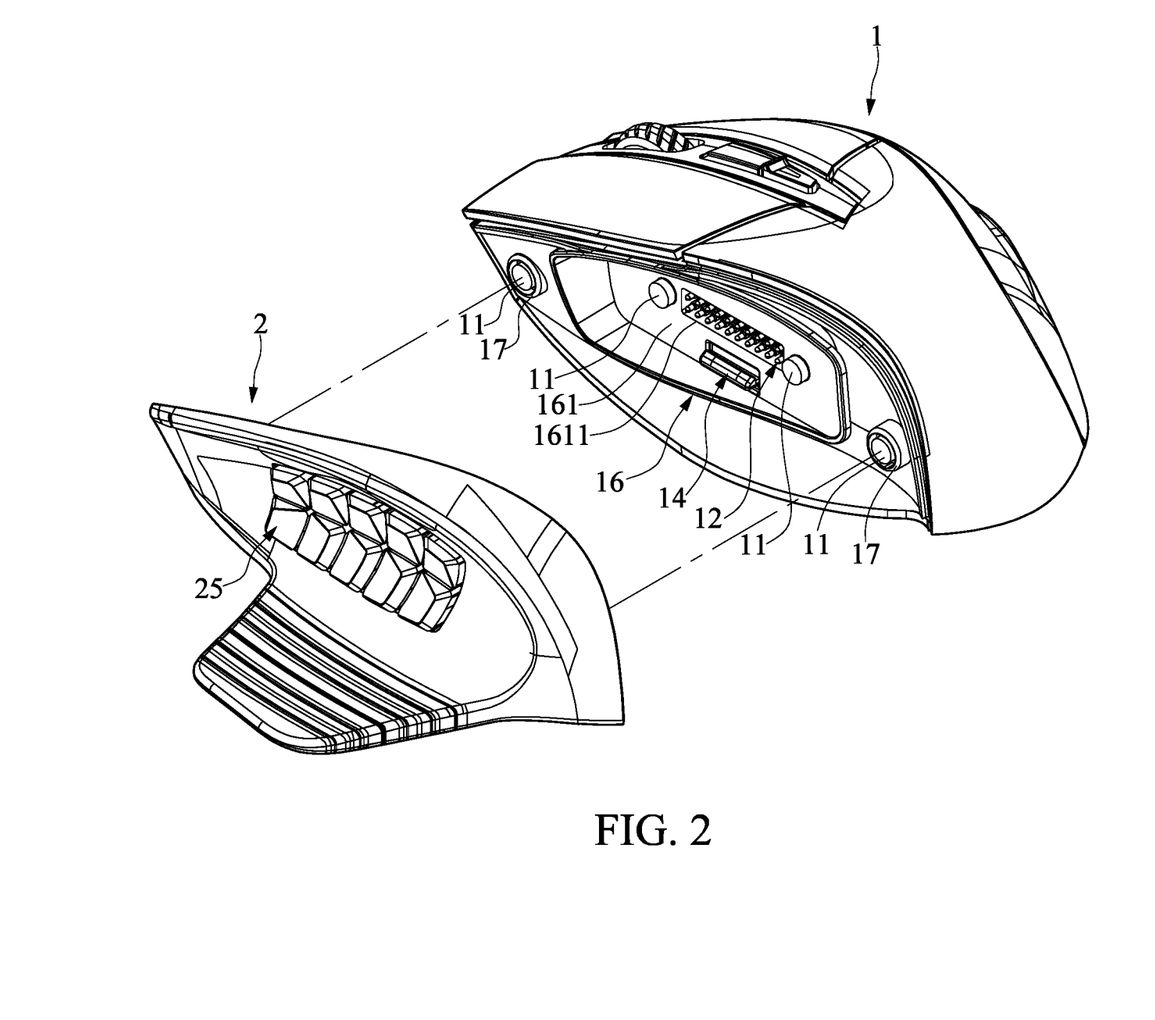
FIG. 2 shows a partially exploded view of the detachable computer mouse of the present disclosure.
Figure 3:
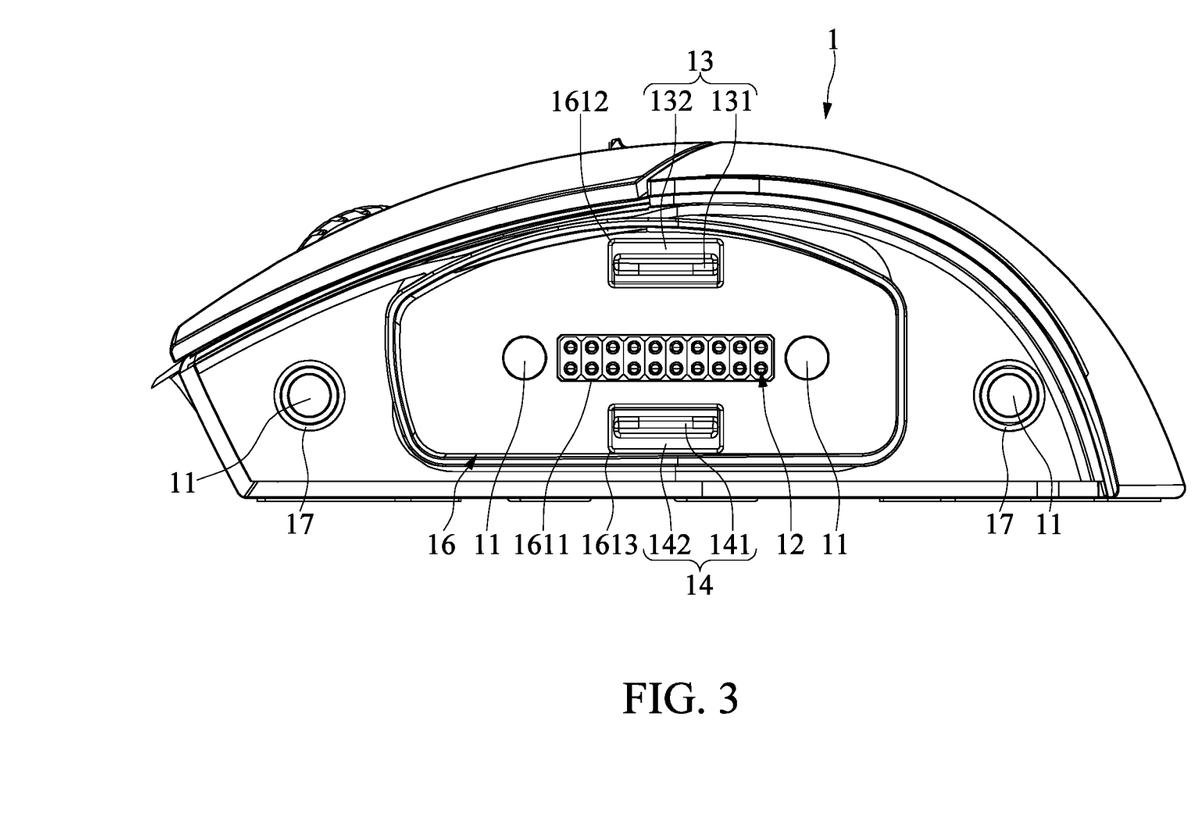
FIG. 3 shows a plan view of a mouse body of the detachable computer mouse of the present disclosure.

As shown in FIG. 2 and FIG. 3, one side of the mouse body 1 is provided with a plurality of first magnetic members 11, a pogo-pin assembly 12, a first snap-fit member 13 and a second snap-fit member 14. In this embodiment, one side of the mouse body 1 may be the left side of the mouse body 1. In other embodiments, the one side of the mouse body 1 may be the right side of the mouse body 1 for a left-handed operator.

Figure 4:
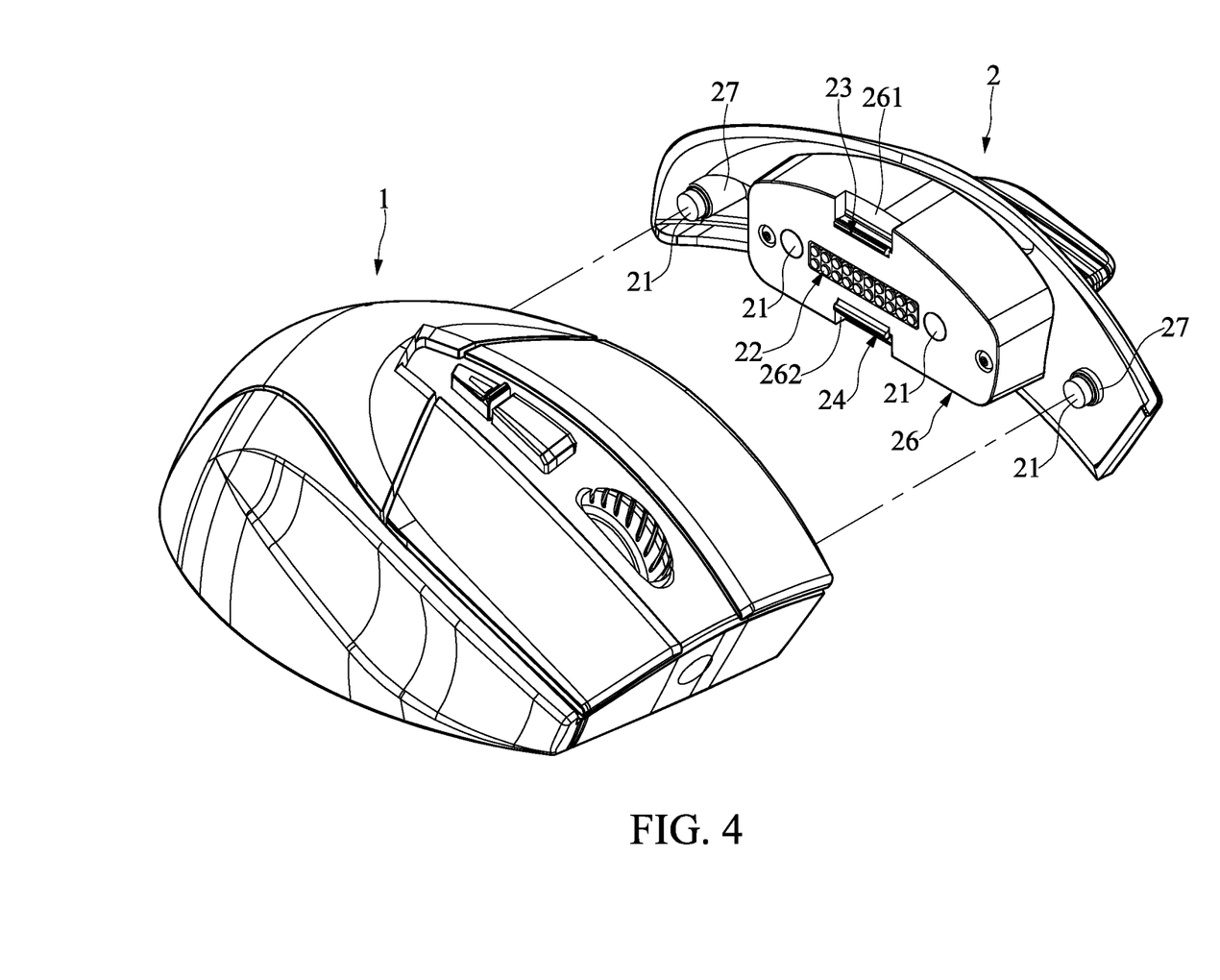
FIG. 4 shows another partially exploded view of the detachable computer mouse of the present disclosure.
Figure 5:
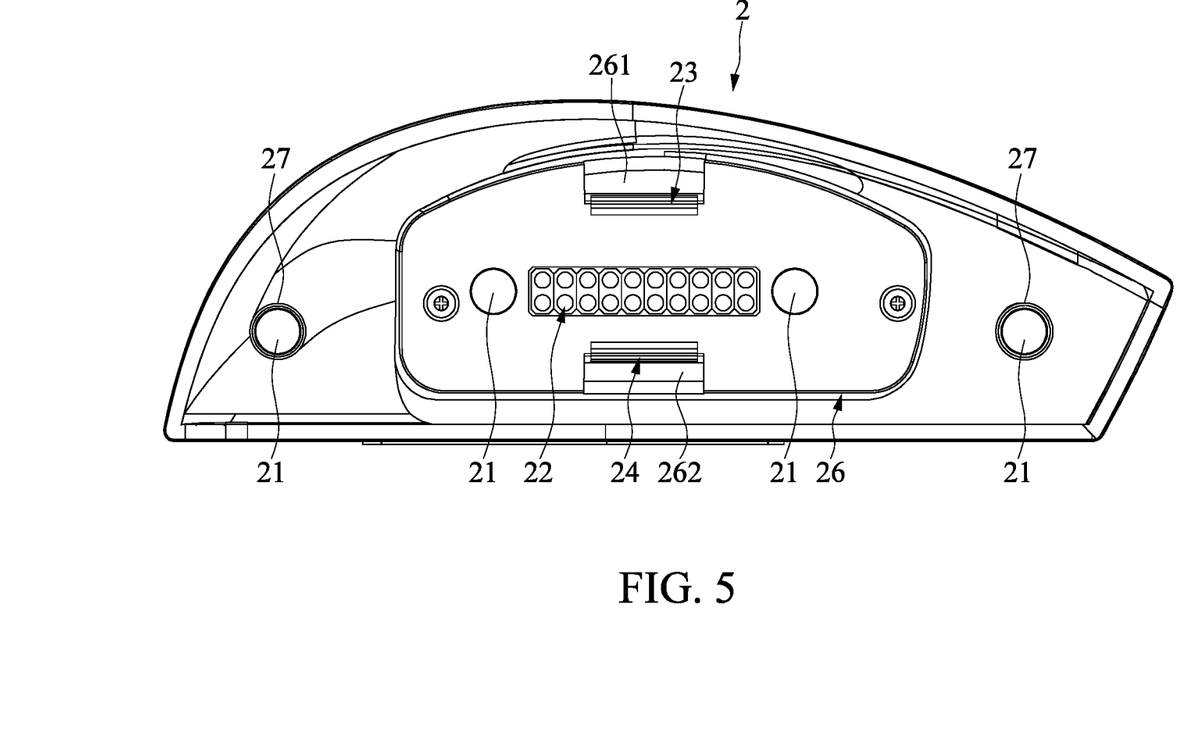
FIG. 5 shows a plan view of a detachable input module of the detachable computer mouse of the present disclosure.

Further, as shown in FIG. 4 and FIG. 5, one side of the detachable input module 2 is provided with a plurality of second magnetic members 21, a metal pad assembly 22, and a first hook 23 and a second hook 24. The other side of the detachable input module 2 is provided with a plurality of function buttons 25 (FIG. 2). In this embodiment, one side of the detachable input module 2 may be the right side of the detachable input module 2, and the function buttons 25 would be located on the left side of the detachable input module 2, that is, on the thumb side.

Each of the first magnetic members 11 corresponds in position to each of the second magnetic members 21. The position of the pogo-pin assembly 12 corresponds to the position of the metal pad assembly 22. The position of the first snap-fit member 13 corresponds to the position of the first hook 23, while the second snap-fit member 14 corresponds to the position of the second hook 24. Therefore, when the detachable input module 2 is coupled to the mouse body 1, the first magnetic members 11 can be correspondingly and magnetically adhered with the second magnetic members 21. The pogo-pin assembly 12 can be correspondingly in direct contact with the metal pad assembly 22, while the first snap-fit member 13 and the second snap-fit member 14 can be elastically snap-fitted to the first hook 23 and the second hook 24, respectively.

As shown in FIG. 4 and FIG. 5, one side of the detachable input module 2 is formed with a coupling protrusion 26, and two protruding studs 27 located relatively on the left and right sides of the coupling protrusion 26, respectively. The metal pad assembly 22 is located approximately at the center of the coupling protrusion 26. In this embodiment, the number of the second magnetic members 21 is four, two of which are disposed on the coupling protrusion 26 and located relatively on the left and right sides of the metal pad assembly 22, respectively, and the other two of which are disposed on the two protruding studs 27, respectively.

The first hook 23 and the second hook 24 may be disposed on the coupling protrusion 26 and located relatively above and below the metal pad assembly 22, respectively. More specifically, the coupling protrusion 26 may be recessed to form a first recess 261 and a second recess 262 relatively above and below the metal pad assembly 22, respectively. The first recess 261 can extend outward to form the first hook 23, and the second recess 262 can extend outward to form the second hook 24.

As shown in FIG. 2 and FIG. 3, one side of the mouse body 1 is formed with a coupling recess 16 and two connecting studs 17 located relatively on the left and right sides of the coupling recess 16, respectively. The coupling recess 16 corresponds in shape to the coupling protrusion 26 such that the coupling protrusion 26 can be correspondingly coupled into the coupling recess 16. Moreover, the pogo-pin assembly 12 is located approximately at the center of the coupling recess 16. In this embodiment, the number of the first magnetic members 11 is four, two of which are disposed in the coupling recess 16 and are located relatively on the left and right sides of the pogo-pin assembly 12, respectively, and the other two of which are disposed on the two protruding studs 17, respectively.

The first snap-fit member 13 and the second snap-fit member 14 can be located relatively above and below the pogo-pin assembly 12, respectively. Further, the coupling recess 16 includes an upright wall 161 where an opening 1611 is formed at its central position. The pogo-pin assembly 12 is exposed from the opening 1611, and the upright wall 161 forms a first limiting opening 1612 and a second limiting opening 1613 which are located relatively above and below the opening 1611, respectively. The first snap-fit member 13 and the second snap-fit member 14 are respectively passed through the first limiting opening 1612 and the second limiting opening 1613. In this embodiment, the shapes of the first limiting opening 1612 and the second limiting opening 1613 are respectively rectangular.

Figure 6:
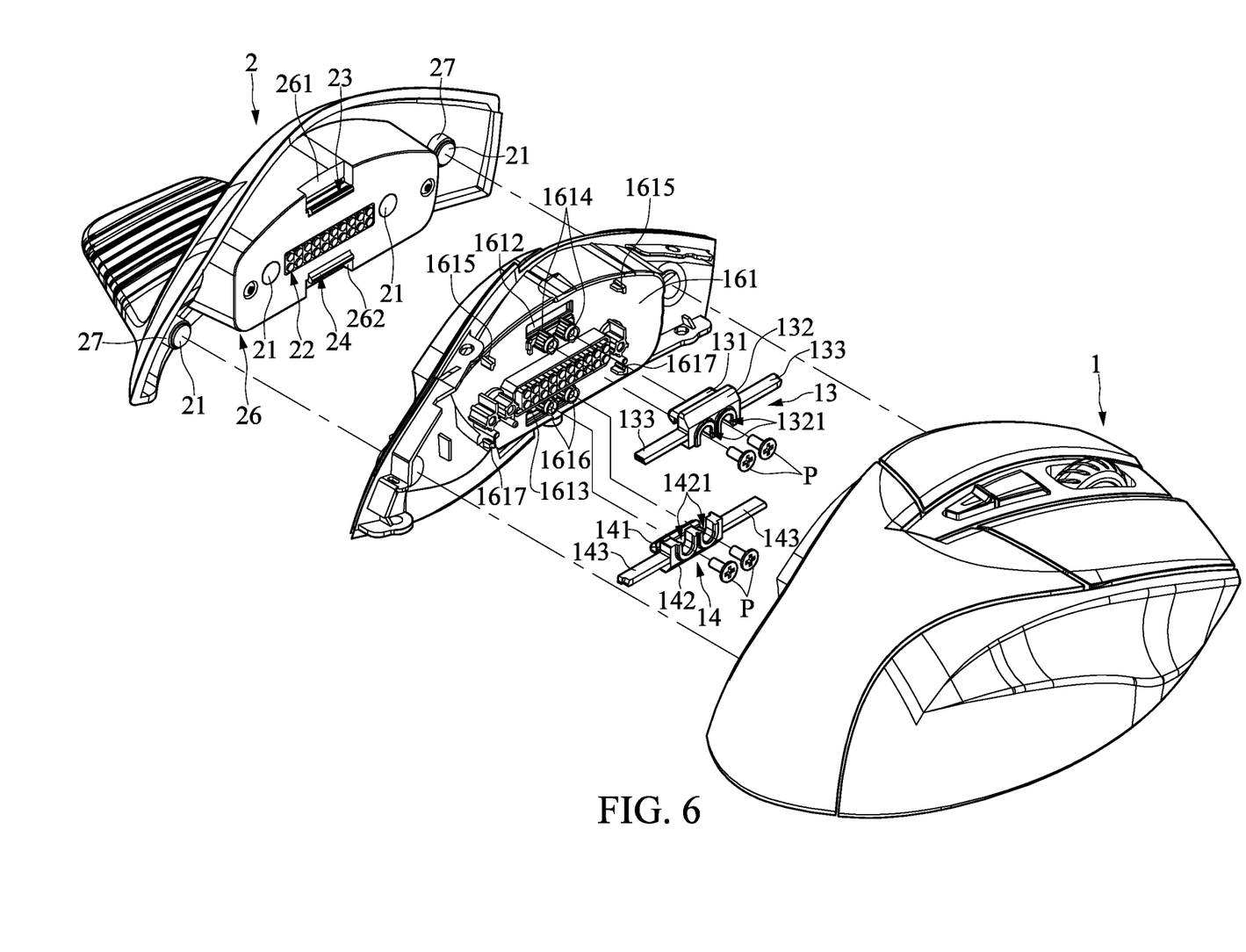
FIG. 6 shows yet another partially exploded view of the detachable computer mouse of the present disclosure.
Figure 7:
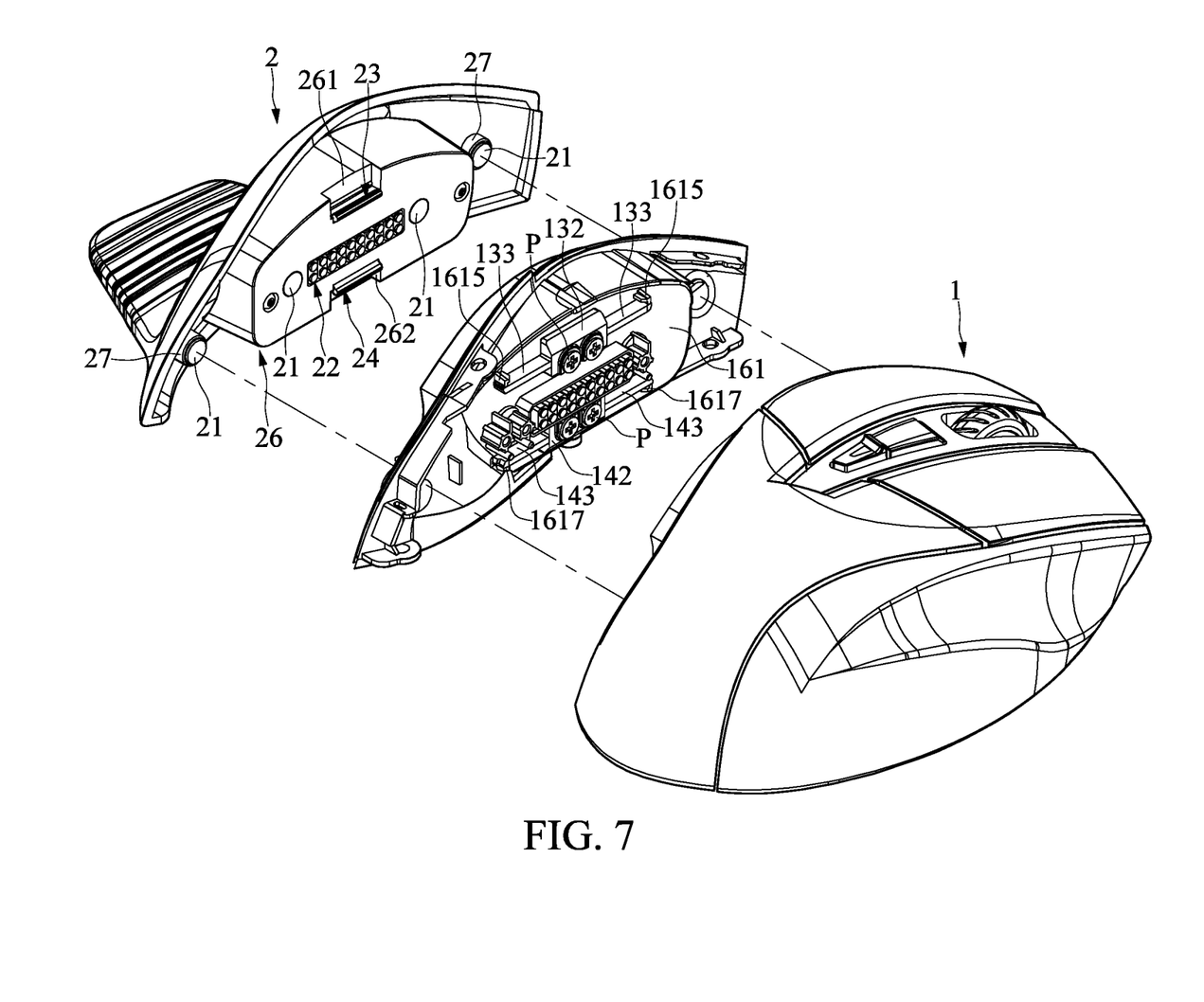
FIG. 7 shows still another partially exploded view of the detachable computer mouse of the present disclosure.

Further, as shown in FIG. 6 and FIG. 7, the first snap-fit member 13 has a first snap-fit arm 131 and a first connecting piece 132 disposed on the back side of the upright wall 161. The first snap-fit arm 131 is formed by extending the first connecting piece 132 forward, and passes through the upright wall 161 through the first limiting opening 1612 to be exposed from the coupling recess 16, such that the first hook 23 can be buckled into the first snap-fit arm 131 when the coupling protrusion 26 is coupled to the coupling recess 16. In addition, two strips of first elastic arms 133 are respectively and integrally formed on two sides of the first connecting piece 132 in the lateral direction. These first elastic arms 133 may be disposed elastically and swingably on the back side of the upright wall 161. The first connecting piece 132 and the first snap-fit arm 131 are elastically movable by the elasticity of the first elastic arms 133, so that the first snap-fit arm 131 can have an elastic snap-fixing function.

In more detail, two first positioning studs 1614 are disposed on the back side of the upright wall 161, and two first curved notches 1321 are formed on the first connecting piece 132. These first curved notches 1321 and the first positioning studs 1614 correspond to each other, namely, the two first curved notches 1321 respectively complement the two first positioning studs 1614 in shape. The first connecting piece 132 can elastically move up and down along the first positioning studs 1614 through the first curved notches 1321. The first positioning studs 1614 can be further secured with screws P to enable the first connecting piece 132 to move more stably without being detached from the first positioning studs 1614. Moreover, two first studs 1615 can be further disposed on the back side of the upright wall 161, and the ends of the first elastic arms 133 can abut against the first studs 1615, respectively. In this manner, when the first connecting piece 132 is moved upward by the external force applied to the first snap-fit arm 131, the first elastic arms 133 on either side of the first connecting piece 132 can be elastically deformed by using the first studs 1615 as fulcrums to generate an elastic restoring force, so that the first snap-fit arm 131 can have an elastic snap-fixing function.

Further, the second snap-fit member 14 has a second snap-fit arm 141 and a second connecting piece 142 disposed on the back side of the upright wall 161. The second snap-fit arm 141 is formed by extending the second connecting piece 142 forward, and passes through the upright wall 161 through the second limiting opening 1613 to be exposed from the coupling recess 16, such that the second hook 24 can be buckled into the second snap-fit arm 141 when the coupling protrusion 26 is coupled to the coupling recess 16. In addition, two strips of second elastic arms 143 are respectively and integrally formed on two sides of the second connecting piece 142 in the lateral direction. These second elastic arms 143 may be elastically and swingably disposed on the back side of the upright wall 161. The second connecting piece 142 and the second snap-fit arm 141 are elastically movable by the elasticity of the second elastic arms 143, so that the second snap-fit arm 141 can have an elastic snap-fixing function.

In more detail, two second positioning studs 1616 are disposed on the back side of the upright wall 161, and two second curved notches 1421 are formed on the second connecting piece 142. These second curved notches 1421 and the second positioning studs 1616 correspond to each other, namely, the two second curved notches 1421 respectively complement the two second positioning studs 1616 in shape. The second connecting piece 142 can elastically move up and down along the second positioning studs 1616 through the second curved notches 1421. The second positioning studs 1616 can be further secured with screws P to enable the second connecting piece 142 to move more stably without being detached from the second positioning studs 1616. Moreover, two second studs 1617 may be further disposed on the back side of the upright wall 161, and the ends of the second elastic arms 143 abut against the second studs 1617, respectively. In this manner, when the second connecting piece 142 is moved downward by the external force applied to the second snap-fit arm 141, the second elastic arms 143 on either side of the second connecting piece 142 can be elastically deformed by using the second studs 1617 as fulcrums to generate an elastic restoring force, so that the second snap-fit arm 141 can have an elastic snap-fixing function.

Figure 8:
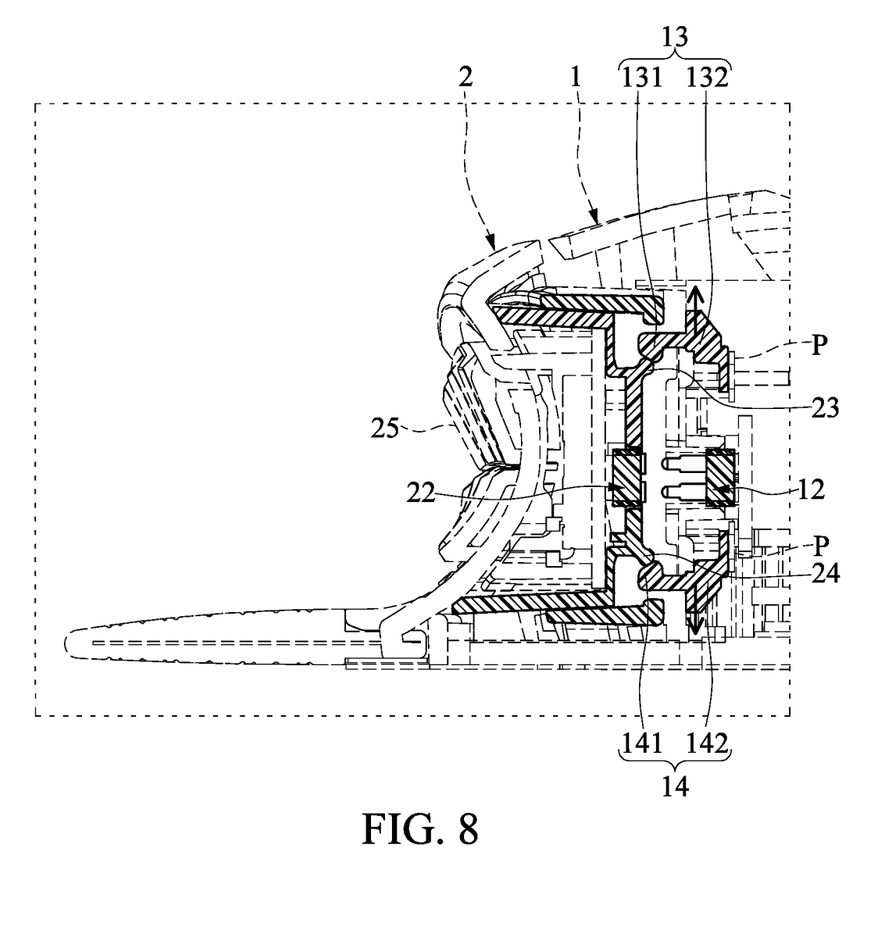
FIG. 8 shows a schematic view of the operation of the detachable computer mouse of the present disclosure.
Figure 9:
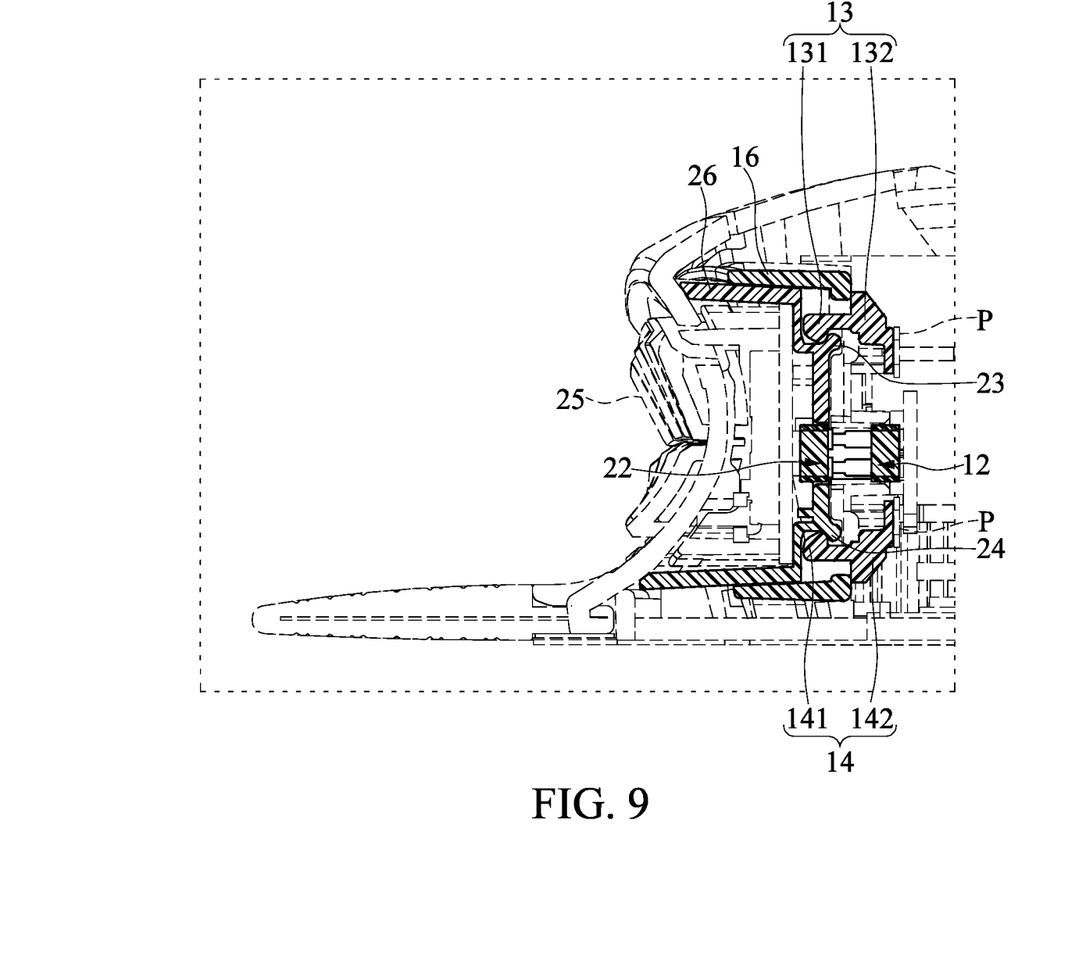
FIG. 9 shows another schematic view of the operation of the detachable computer mouse of the present disclosure.

As shown in FIG. 8 and FIG. 9, the distance from the contact surface of the first snap-fit arm 131 to the contact surface of the second snap-fit arm 141 may be smaller than that from the contact surface of the first hook 23 to the contact surface of the second hook 24. Therefore, when the detachable input module 2 is coupled to the mouse body 1, the first hook 23 and the second hook 24 can respectively contact and push against the first snap-fit member 13 and the second snap-fit member 14. As a result, the first snap-fit member 13 and the second snap-fit member 14 can generate elastic displacement through the elasticity of the first elastic arm 133 and the second elastic arm 143, respectively, so that the first and second snap-fit members 13, 14 can be elastically snap-fitted to the first hook 23 and the second hook 24, respectively. Therefore, by utilizing the elastic characteristic of the elastic arms to cause the elastic displacement of the snap-fit members, the hooks can be engaged or disengaged, so as to effectively solve the problem that the pogo-pin assembly and the metal pad assembly cannot be firmly mated by only the magnetic attraction produced by magnets.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A detachable computer mouse, comprising:
    a mouse body with a plurality of first magnetic members, a pogo-pin assembly, a first snap-fit member and a second snap-fit member disposed at one side of the mouse body; and
    a detachable input module with a plurality of second magnetic members, a metal pad assembly, a first hook and a second hook disposed at one side of the detachable input module, and a plurality of function buttons disposed at another side of the detachable input module;
    wherein the detachable input module is selectively coupled to the mouse body, the first magnetic members are correspondingly and magnetically adhered with the second magnetic members, the pogo-pin assembly is correspondingly in direct contact with the metal pad assembly, and the first snap-fit member and the second snap-fit member are respectively elastically snap-fitted to the first hook and the second hook when the detachable input module is coupled to the mouse body;
    wherein the one side of the detachable input module is formed with a coupling protrusion and two protruding studs located relatively on left and right sides of the coupling protrusion, respectively, the metal pad assembly is located at a center of the coupling protrusion, the number of the second magnetic members is four, two of the second magnetic members are disposed on the coupling protrusion and located relatively on left and right sides of the metal pad assembly, respectively, and the other two of the second magnetic members are disposed on the two protruding studs, respectively.

2. The detachable computer mouse according to claim 1, wherein the coupling protrusion is recessed to form a first recess and a second recess relatively above and below the metal pad assembly, respectively, the first hook is formed by extending the first recess outward, and the second hook is formed by extending the second recess outward.

3. The detachable computer mouse according to claim 1, wherein the one side of the mouse body is formed with a coupling recess and two connecting studs located relatively on left and right sides of the coupling recess, respectively, the coupling recess corresponds in shape to the coupling protrusion such that the coupling protrusion can be correspondingly coupled into the coupling recess, the pogo-pin assembly is located at a center of the coupling recess, the number of the first magnetic members is four, two of the first magnetic members are disposed in the coupling recess and are located relatively on left and right sides of the pogo-pin assembly, respectively, and the other two of the first magnetic members are disposed on the two protruding studs, respectively.

4. The detachable computer mouse according to claim 3, wherein the coupling recess includes an upright wall where an opening is formed at its center, the pogo-pin assembly is exposed from the opening, the upright wall forms a first limiting opening and a second limiting opening which are located relatively above and below the opening, respectively, and the first snap-fit member and the second snap-fit member respectively pass through the first limiting opening and the second limiting opening.

5. The detachable computer mouse according to claim 4, wherein the first snap-fit member has a first snap-fit arm and a first connecting piece movably disposed on a back side of the upright wall, the first snap-fit arm is formed by extending the first connecting piece forward, and the first snap-fit arm is exposed from the coupling recess by passing through the upright wall through the first limiting opening, and wherein the second snap-fit member has a second snap-fit arm and a second connecting piece movably disposed on the back side of the upright wall, the second snap-fit arm is formed by extending the second connecting piece forward, and the second snap-fit arm is exposed from the coupling recess by passing through the upright wall through the second limiting opening.

6. The detachable computer mouse according to claim 5, wherein two first elastic arms are respectively formed on two sides of the first connecting piece in a lateral direction, and the two first elastic arms are elastically and swingably disposed on the back side of the upright wall, such that the first connecting piece and the first snap-fit arm are elastically movable by the elasticity of the first elastic arms, and wherein two second elastic arms are respectively formed on two sides of the second connecting piece in a lateral direction, and the two second elastic arms are elastically and swingably disposed on the back side of the upright wall, such that the second connecting piece and the second snap-fit arm are elastically movable by the elasticity of the second elastic arms.

7. The detachable computer mouse according to claim 6, wherein two first positioning studs are disposed on the back side of the upright wall, two first curved notches are formed on the first connecting piece, and the two first curved notches respectively correspond in shape to the two first positioning studs such that the first connecting piece can elastically move up and down along the first positioning studs through the first curved notches, and wherein two second positioning studs are disposed on the back side of the upright wall, two second curved notches are formed on the second connecting piece, and the two second curved notches respectively correspond in shape to the two second positioning studs such that the second connecting piece can elastically move up and down along the second positioning studs through the second curved notches.

8. The detachable computer mouse according to claim 7, wherein two first studs are disposed on the back side of the upright wall and ends of the first elastic arms abut against the first studs, respectively, and wherein two second studs are disposed on the back side of the upright wall and ends of the second elastic arms abut against the second studs, respectively.

* * * * *